July 28, 1942.   L. O. CARLSEN   2,291,147
CHUCKING MECHANISM
Filed Nov. 18, 1940   2 Sheets-Sheet 1

Inventor
LEONARD O. CARLSEN
By
Attorney

July 28, 1942.  L. O. CARLSEN  2,291,147
CHUCKING MECHANISM
Filed Nov. 18, 1940  2 Sheets-Sheet 2

Inventor
LEONARD O. CARLSEN
By
Attorney

Patented July 28, 1942

2,291,147

UNITED STATES PATENT OFFICE 2,291,147

CHUCKING MECHANISM

Leonard O. Carlsen, Rochester, N. Y., assignor to Gleason Works, Rochester, N. Y., a corporation of New York Application November 18, 1940, Serial No. 366,196

4 Claims. (Cl. 279—4)

The present invention relates to hydraulic control mechanisms and particularly to a hydraulic control mechanism such as may be employed in actuating a chuck.

One object of the invention is to provide a chucking mechanism of relatively simple construction in which the chuck is not only released hydraulically but also moved to chucking position hydraulically.

A further object of the invention is to provide a full hydraulically operated chucking mechanism, which can be operated in conjunction with other hydraulically operated parts of a machine, but in which the chucking pressure may be adjusted and predetermined in accordance with characteristics of the job to be chucked.

Still another object of the invention is to provide a pressure reducing valve of simple construction that may be employed with the chucking mechanism of the present invention or with other hydraulically controlled apparatus for predetermining the operating pressure of said chucking mechanism or apparatus.

A still further object of the invention is to provide a draw-bar type chucking mechanism which will permit of adjusting and removing the draw-bar from either end of the work spindle on which the chucking mechanism is used.

Other objects of the invention will be apparent hereinafter from the specification and from the recital of the appended claims.

Chucking mechanisms in which the chuck is held in operative position by spring pressure and is released by hydraulic pressure are in rather common use, but full hydraulically operated chucks have heretofore had only limited usage. This is due principally to the fact that such as have heretofore been built have either been complicated in construction or have lacked means for adjusting the chucking pressure to suit different jobs. To properly hold a large, heavy gear in a gear cutting machine, for instance, there must be a rather high pressure exerted on the draw-bar of the chucking mechanism, but if this same pressure is used, when a gear of thin section is being cut, the gear will be warped by the chucking pressure and will not be cut accurately.

The problem of adjusting the operating pressure to suit the job is further complicated in machines of modern design by reason of the fact that in such machines there are frequently several different parts operated by hydraulic pressure. Thus, it is the practice in gear cutting machines today to move the work head to and from operating position by hydraulic power, and to clamp the work head in operating position by hydraulic power. The power required for these functions determines the pressure at the supply pump, and determines, therefore, the pressure of the motive fluid that flows to the chucking mechanism. Hence a problem is presented, not merely of adjusting the pressure in the chucking mechanism itself for different jobs, but of adjusting this pressure relative to the pressure employed in other parts of the machine, whose pressure is derived from the same source as the chucking pressure.

These difficulties have been overcome in chucking mechanisms constructed according to the present invention through use of an adjustable reducing valve in the line that is on pressure when the chucking mechanism is in operative position. This permits of reducing the primary pressure, which is used on the machine and which is required for the operation of other hydraulic parts of the machine, to a pressure suitable for the chucking requirements. Further than this, by adjusting the reducing valve, the pressure in the operating line of the chucking mechanism can be controlled to suit the particular work which is being operated upon, and a smaller pressure can be employed where the work piece is of thin section than is used where the work piece is of heavy section.

The chuck proper may be of any suitable construction, but is preferably piston-actuated. That is, the draw bar of the chucking mechanism is preferably connected to a piston which is moved in one direction to effect chucking, and in the opposite direction to release the chuck. The reducing valve is incorporated, as already stated, in the line that is on pressure when the piston is in chucking position.

The reducing valve may be of any suitable construction, but I have designed and preferably employ with the chucking mechanism of the present invention a reducing valve which is of novel construction. This comprises a balanced valve which is spring pressed in one direction and which is urged in the opposite direction by hydraulic pressure. The valve is so constructed that the tension of the spring can be adjusted, and thereby the pressure on the operating side of the chuck-piston can be controlled. The pressure fluid, which operates the chuck, is delivered to the chamber in which the reducing valve is mounted, and from this chamber it is delivered to the operating side of the piston. The reducing valve controls the flow of the pressure fluid through the chamber. The valve is formed with two spaced piston-like portions, and the pressure fluid flowing into the valve chamber operates on adjacent opposed faces of the piston-like portions to produce a balanced effect. The coil spring, already referred to, operates on the opposite side of one of these piston-like formations and the pressure fluid operates on the opposite face of the other piston-like formation. The latter piston-like formation is connected to the line that flows to the chuck-piston, so that the same pressure is applied to the reducing valve, tending to move it in one direction, as is employed for the operating pressure of the chuck. The coil spring operates against this pressure. A slight leakage serves to bleed the line that supplies the pressure fluid which tends to move the reducing valve.

When pressure is applied to the chuck-piston to move the draw bar to operating position, the chuck-piston is first moved rearwardly in its cylinder to move the chuck to chucking position. Then the pressure on the chuck-piston builds up. This pressure acting on the one face of the piston-like formation of the reducing valve forces the valve closed against the resistance of the spring. When the pressure on the valve is reduced again, however, through leakaage, the spring forces the valve open. When the pressure is built up again, the valve is closed, etc. In actual practice, an equilibrium is established and the desired pressure is maintained on the operating side of the chuck-piston. By simply adjusting the tension of the spring, then, this pressure can be changed to suit the job being chucked.

In the preferred construction, the chuck-piston is provided with a centrally-disposed bore that extends through it from front to rear, and the draw-bar passes entirely through this bore, being adjustably connected to the piston at the rear end thereof. This construction is especially advantageous where different type chucks are being used. It provides a readily accessible adjustment for adjusting the draw-bar axially relative to the chuck-piston to control the effective length of movement of the draw-bar. Pot-chucks, plate-chucks, collet-chucks, all require different amounts of movement of a draw-bar to effect chucking. With chucking mechanisms of prior construction, the chuck actuating parts had to be partially or wholly disassembled to adjust the length of movement of the draw-bar, and, if a draw-bar of one length had to be substituted for a draw-bar of a different length, this same partial or total disassembly had to be made. With the chucking mechanism of the present invention, the draw-bar can be adjusted from the rear of the work spindle and assembled or disassembled from either front or rear of the spindle.

One embodiment of the invention is illustrated in the drawings in which.

Figure 1:
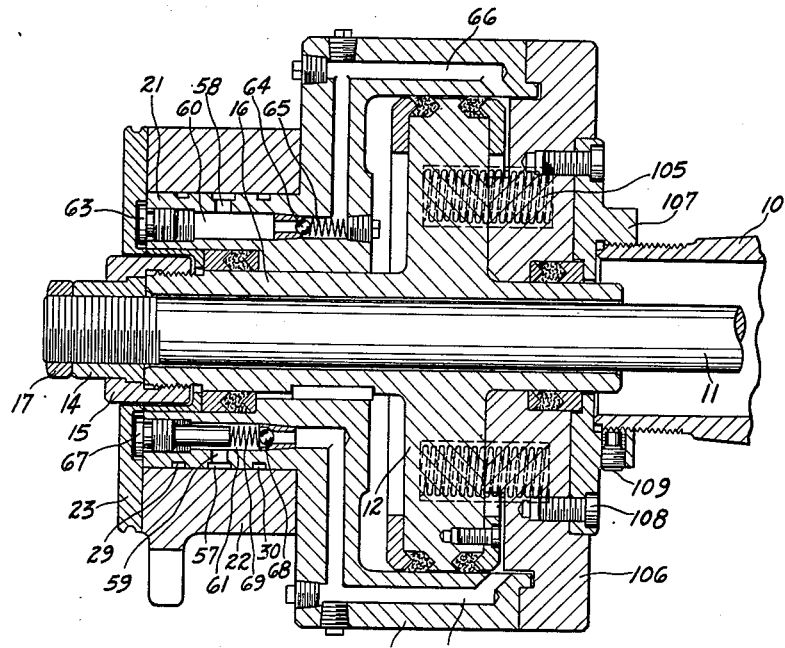
Fig. 1 is a sectional view through the operating end of a chucking mechanism constructed according to a preferred embodiment of the present invention.
Figure 2:
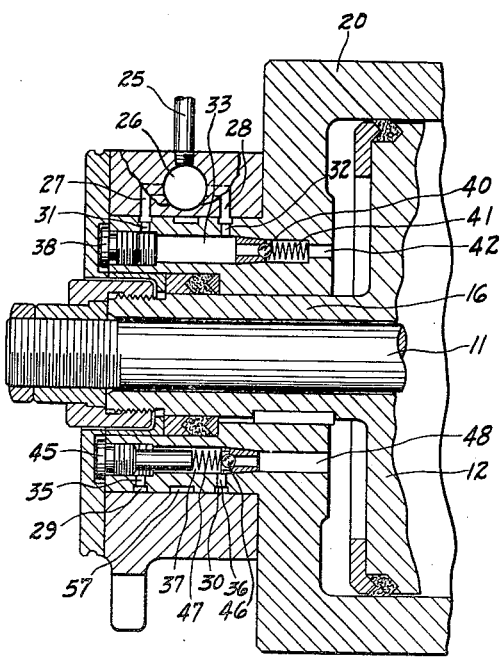
Fig. 2 is another sectional view through the operating end of this chucking mechanism but taken along a different line.

Reference will now be had to the drawings for a more detailed description of the invention.

10 denotes the work spindle of the machine on which the chucking mechanism of the present invention is to be used. 11 denotes a draw-bar which is connected to the chuck that is employed for securing the work to this work spindle. The chuck proper does not form any part of the present invention. Suffice it to say that the chuck is moved to operative position by rearward movement of the draw bar 11 in the work spindle 10, and the chuck is released by forward movement of the draw bar 11 in the work spindle 10.

The rear end of the draw bar passes through the centrally disposed bore of a piston 12, and the draw bar is adjustably secured to this piston through the medium of a collar 14 and a nipple 15. The collar is threaded onto the draw bar, and the nipple engages over a flange formed on the collar and threads onto the rearwardly projecting portion 16 of the piston. By rotating the collar 14, the draw-bar can be adjusted axially to adjust its effective length relative to the piston 12 to suit different types of chucks and different work-pieces. Also by rotating the collar 14 and nipple 15, the draw-bar can be removed from the work-spindle 10 either through the front end or the rear end of the spindle. A lock-nut 17 holds the collar in position on the draw-bar.

Figure 3:
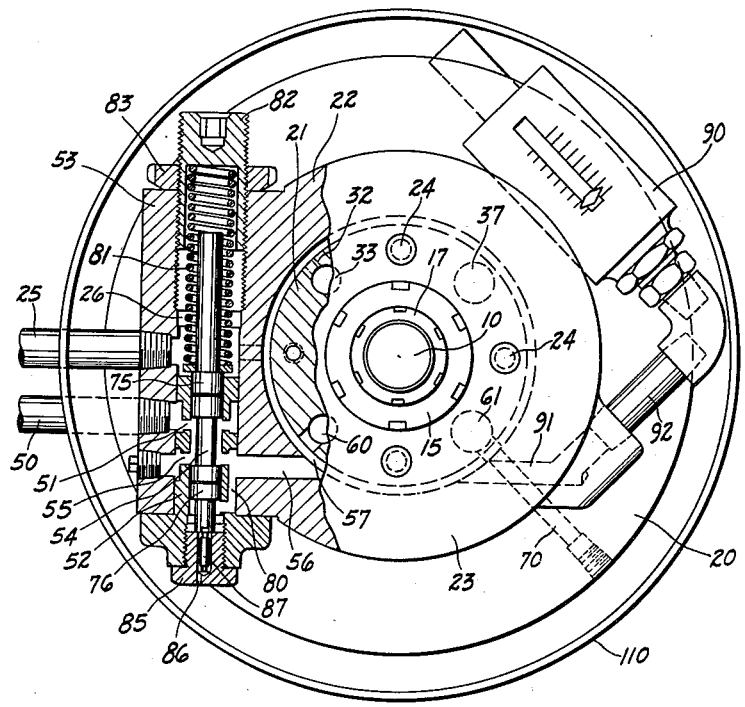
Fig. 3 is a rear elevation of the operating end of the chucking mechanism, with parts broken away.

The piston 12 is mounted to reciprocate in a cylinder or housing 20. This housing is generally cylindrical in shape and has an extension 21 formed on its rear end which is of reduced diameter and also cylindrical in shape. A ring-like member 22 fits around the extension 21 of the housing 20. This member is secured against axial movement relative to the housing 20 by an end plate 23. The end plate is secured to the extension 21 of the housing by screws 24 (Fig. 3).

The motive fluid is supplied to or exhausted from one side of the piston 12 through a pipe 25. This pipe communicates with the bore 26 (Fig. 3) that is formed in the enlarged portion 53 of the ring-like member 22. Ducts 27 and 28 lead from this bore 26. The duct 27 communicates with a circular groove 29, which is formed in the periphery of the extension 21 of the cylinder 20. The duct 28 communicates with a circular groove 30 also formed in the extension 21 of the cylinder 20 and spaced from the groove 29. The grooves 29 and 30 communicate through ports 31 and 32, respectively, with a duct 33. The grooves 29 and 30 also communicate through ports 35 and 36 with the duct 37.

One end of the duct 33 is closed by a plug 38 and in its other end there is mounted a ball check valve 40. The ball check valve 40 is normally held seated by a spring 41, to normally close the duct 33 from communication with the duct 42 that leads into the cylinder 20 in the rear of the piston 12.

One end of the duct 37 is closed by a plug 45 and in the opposite end there is mounted a ball check valve 46 that is held in normally closed position by a coil spring 47, thus normally closing communication between the duct 37 and the duct 48 that leads into the cylinder 20 at the rear of the piston 12. It will be noted that both the duct 42 and the duct 48 lead to the rear face of the piston 12, but they are at opposite sides of the longitudinal axis of the piston.

The motive fluid is supplied to and exhausted from the front face of the piston 12 through the pipe 50 (Fig. 3). This pipe communicates with radially disposed ports 51 formed in a sleeve or chamber 52 in which the reducing valve 54 is mounted. This sleeve or chamber 52 fits into the bore 26 of the enlarged portion 53 of the ring-like member 22. The sleeve or chamber 52 is also provided with ports 55. These ports 55 communicate with the duct 56 that leads to a circular groove 57 formed on the periphery of the extension 21 of the cylinder 20. The groove 57 lies between the grooves 29 and 30 and communicates through a port 58 with a duct 60. The groove 57 also communicates through a port 59 with a duct 61.

One end of the duct 60 is closed by a plug 63 and in its opposite end there is mounted a ball check valve 64. This valve is normally held closed by a coil spring 65, so as to close communication between the duct 60 and a duct 66. The duct 66 leads to the front end of the cylinder 20.

One end of the duct 61 is closed by a plug 67 and in its opposite end there is mounted a ball check valve 68. This ball check valve is normally held closed by a coil spring 69 so as to close off communication between the duct 61 and a duct 70 that leads to the front end of the cylinder 20.

The ducts 66 and 70 are of the shape shown in Fig. 1 and communicate with the front face of the piston 12 at opposite sides of the longitudinal axis of the piston 12.

The reducing valve 54 (Fig. 3) is of the balanced type. It has two spaced piston formations 75 and 76 that are connected by a reduced stem portion. The opposed adjacent faces of the piston-like formations 75 and 76 have the same exposed surface area. These piston-like formations 75 and 76 control the flow of the motive fluid between the line 50 and the duct 56.

There is a duct 80 that leads from the duct 56 to the under side of the piston-like formation 76 of the valve 54. Thus the pressure of the motive fluid flowing into the duct 56 is also exerted on the under face of the piston-like formation 76 forcing the valve upwardly in the sleeve 52. A coil spring 81, which surrounds the upper portion of the valve stem, serves to normally press the valve downwardly against the pressure exerted by the motive fluid on the under face of the piston-like formation 76. The coil spring 81 is interposed between the upper face of the piston-like formation 75 of the valve and a nut 82. This nut threads adjustably into the bore 26 of the ring-like member 22 and it is secured in any adjusted position by a lock-nut 83.

The lower end of the sleeve 52 is closed by a cap 85. This cap has a hole 86 drilled in it that communicates with the duct 80. This hole is of a sufficient diameter to receive the pin 87.

The hole 86 allows a certain amount of leakage from the duct 80. The amount of this leakage is determined, of course, by the difference in diameter between the hole and the pin 87. The use of the pin 87 prevents the leakage being stopped by dust or grit, since there is a space all around the periphery of the pin between the pin and the hole.

The piston 12 is shown in Fig. 1 in its releasing position. When it is desired to chuck a work piece on the spindle of the machine on which the chucking mechanism of the present invention is employed, the draw bar 11 is moved rearwardly by application of pressure fluid to the front face of the piston 12. For this purpose, the line 50 is put on supply. The pressure fluid then flows from the line 50 through the ports 51 and 55 of the sleeve 52, the duct 56, the groove 57 in the extension 21 of the cylinder 20, and the port 58 into the duct 60. The pressure of the motive fluid forces the ball check valve 64 open against the resistance of the spring 65, and the motive fluid flows on through the duct 66 to the front face of the piston 12 to move the piston rearwardly and effect the chucking operation. At this time, the ball check valve 68 is held closed by the coil spring 69 and by the pressure of the motive fluid on that valve. At this time, also, the motive fluid is being exhausted from the rear end of the cylinder 20 through the duct 48, the now-open ball check valve 46, the ports 35 and 36, the grooves 29 and 30, the ducts 27 and 28, the bore 26 and the pipe 25. The duct 33 is at this time closed to exhaust by the ball check valve 40 and by the pressure of the motive fluid on this valve.

When it is desired to release the chuck, the line 25 is put on supply and the line 50 on exhaust. The pressure fluid then flows from the line 25 through the bore 26, ducts 27 and 28, the grooves 29 and 30, the ports 31 and 32, the duct 33, the ball check valve 40, and the duct 42 into the rear end of the cylinder 20. At this time, the pressure of the motive fluid aids the spring 47 in keeping the ball check valve 46 closed. At this time, also, the motive fluid will exhaust from the front end of the cylinder 20 through the duct 70, the ball check valve 68, the port 59, the groove 57, the duct 56, the ports 55 and 51 of the sleeve 52, and the line 50. The ball check valve 54 is at this time held closed by the coil spring 85 and by the pressure of the exhaust fluid.

The several ball-check valves 40, 46, 64 and 68 are provided to insure sufficient operating pressure in the system for the movements of the piston 12 and to prevent vibration or chatter. They also serve to keep air from entering into the system where the chucking mechanism stands idle for a relatively long length of time, as, for instance, overnight, and they also help to prevent leakage.

The provision of three grooves 29, 57 and 30 in the extension 21 of the housing 20 balances the pressure on this extension. If only two grooves were provided, one being on pressure and the other on exhaust there might be a tendency of the extension 21 to bind in the ring-like member 22. This would be very serious, for in any gear cutting machine, the work spindle must be rotated periodically for indexing and in a gear generating machine the work spindle must rotate also during cutting, and, where the work spindle rotates, the housing 20 and its extension 22 must rotate with the spindle. With the construction illustrated, no binding is possible. If the middle groove 57 is on supply, the two grooves 29 and 30, at either side of the middle groove 57, are on exhaust and there is no cramping of the extension 21 in the ring-like member 22. Similarly, when the grooves 29 and 30 are on supply and the groove 57 is on exhaust, a balanced effect will be obtained, and again there will be no tendency of the extension 21 to be cramped in the ring-like member 22. A further advantage of the three grooves 29, 57 and 30 is better lubrication of the periphery of the extension 21 when the extension is rotating in the ring-like member 22 as is the case during indexing of the work spindle or generating rotation thereof. The ring-like member 22 is, of course, secured in any suitable manner to a relatively fixed part of the machine.

The function of the reducing valve 54, as already stated, is to control the amount of chucking pressure. The amount of chucking pressure can be controlled by adjusting the tension of the coil spring 81 through adjustment of the nut 82. When the line 50 is first opened to supply, the pressure in the duct 56 builds up to a point where it is sufficient to move the piston 12 from the position shown in Fig. 1 rearwardly in the cylinder 20. After the piston has bottomed in the left hand end of the cylinder 20, the pressure in the line 56 continues to build up. As this pressure builds up, it builds up also in the duct 80, exerting pressure on the under face of the piston-like formation 76, forcing the valve 54 upwardly against the resistance of the spring 81. This causes the piston formation 76 to close the ports 55. Leakage from the hole 86, however, reduces the pressure on the under face of the formation 76, and the ports 55 are opened again by action of the spring 81. This allows the pressure on the front face of the piston 12 to build up again, and the ports 55 are again closed by the piston formation 76 of the reducing valve. In actual practice, a condition of equilibrium is established, and the reducing valve remains open a constant amount determined by the tension of the spring 81 and by the amount of leakage that can occur through the hole 86. It will be obvious, then, that by varying the tension of the spring 81, different pressures on the front face of the piston 12 can be obtained. Thus, the chucking pressure can be adjusted to suit the nature of the work which is to be chucked.

When the line 25 is on supply and the line 50 on exhaust, the pressure fluid flows into the bore 26. The pressure exerted by this liquid on the upper face of the piston formation 75 serves to hold the reducing valve 54 open against any back-pressure exerted by the exhausting liquid on the lower face of the piston formation 76.

For the purpose of readily adjusting the chucking pressure, a pressure gauge 90 may be provided. This gauge may be of any suitable construction and may be connected to the groove 57 in the extension 21 by a duct 91 and a pipe 92.

Figure 4:
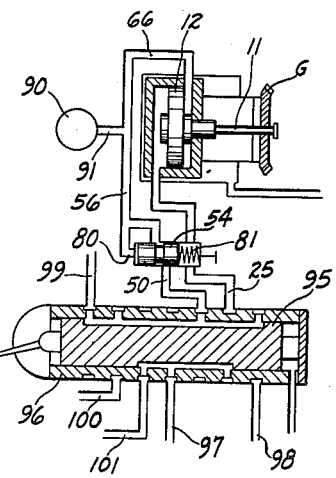
Fig. 4 is a diagrammatic view showing how the chucking mechanism of the present invention may be connected with a standard control valve on a machine having several different hydraulically actuated parts.

As already stated, one of the advantages of the present invention is that it permits of employing a chucking pressure different from the pressure at the source of the motive fluid, that is, at the pump, and different from the pressure employed in other parts of the machine on which the chucking mechanism is used. Thus, the chucking mechanism may be employed on a gear cutting machine on which hydraulic pressure is also used for moving the work head to and from operative position, and for clamping the work head in operative position. In such a machine, it is usual to employ a rotary control valve, such as illustrated diagrammatically at 95 in Fig. 4, to control the various hydraulic operations.

The pressure fluid may be supplied from the hydraulic pump to the chamber 96 of this valve through a line 97. The pressure fluid may be exhausted from the chamber 96 through the line 98. A line 99 may lead from the valve chamber to the mechanism for clamping the work head, and lines 100 and 101 may lead from this chamber to the opposite sides of the piston that is used for moving the work head between chucking and operating positions. The lines 25 and 50, which lead to the chucking mechanism, are also connected to the chamber of this rotary control valve 95. It will thus be seen that while the motive fluid at pump pressure may be supplied through the line 99 to the clamping mechanism and through the lines 100 and 101 to the mechanism for moving the work head, the amount of chucking pressure will be controlled by the reducing valve 54. Hence, when the draw bar 11 is moved to the rear, by rearward movement of the piston 12, to chuck the gear blank G, the amount of pressure on the front face of the piston 12 will be determined, as described, by the tension of the spring 81 of the reducing valve 54. It will thus be seen that the chucking pressure may be different from the pressure used for operating other parts of the machine.

Where the machine is shut down for some time, as for instance, overnight, there may be some leakage from the hydraulic system. It may therefore be desirable to employ an auxiliary holding means, such as the coil springs 105 shown in Fig. 1, to hold the piston 12 and draw bar 11 in chucking position. These springs are mounted in suitable aligned recesses formed in the piston 12 and in the cover plate 106 of the cylinder 20 and they are interposed between the piston and the cover plate. The cover plate 106 is secured to the cylinder 20 by screws (not shown). The work spindle 10 is secured to the cover plate by a nut 107 that threads onto the rear end of the work spindle and that is fastened to the cover plate 106 by screws 108. A set-screw 109 serves to hold the nut 107 against rotation relative to the work spindle 10.

A guard 110, shown only in Fig. 3, may be provided to surround the chuck operating mechanism and to protect the same. This guard may be connected to the chuck operating mechanism in any suitable manner.

As has already been stated, while the reducing valve of this invention has been described as used on a chucking mechanism, it will be understood that it may be employed in various other connections. Thus, it may be said that while the invention has been described in connection with a particular embodiment thereof and in connection with a particular use therefor, the invention is capable of various modifications and uses, and this application is intended to cover any variations, uses, or adaptations of the invention following, in general, the principles of the invention and including such departures from the present disclosure as come within known or customary practice in the art and as may be applied to the essential features hereinbefore set forth and as fall within the scope of the invention or the limits of the appended claims.

Having thus described my invention, what I claim is:

1. In a chucking mechanism, the combination with a chuck of a cylinder, a piston connected to said chuck and reciprocable in said cylinder, ducts for conducting motive fluid to and from opposite sides of the piston to effect movement of the chuck to and from operative position, a balanced reducing valve interposed in the duct that leads to the side of the piston which is on supply when the chuck is in chucking position, said valve being adapted to control the pressure in said duct when it is on supply, a by-pass for conducting fluid under pressure from said duct to the valve to urge said valve in one direction, a spring operatively connected to said valve to urge said valve in the opposite direction, whereby said valve operates to maintain a predetermined pressure on the chucking side of said piston when said duct is on supply, and means for adjusting the tension of said spring to control the amount of chucking pressure on said piston.

2. In a chucking mechanism, the combination with a chuck, of a cylinder, a piston reciprocable in the cylinder and connected to the chuck, ducts for conducting the motive fluid to and from opposite sides of the piston to move the chuck to and from operative position, a housing having inlet and outlet ports, a valve mounted in said housing to control the connection between said ports, the duct which is connected to the side of the piston, that is on supply when the chuck is in operative position, being connected to the outlet port of said housing, means for supplying fluid under pressure to the inlet port of said housing, said valve being of the balanced type and having two piston-like portions whose adjacent opposed faces have the same surface area, a by-pass connecting the duct, which is on supply when the chuck is in operative position, with the opposite face of one of the piston-like portions of said valve so that the pressure of the motive fluid may urge said valve in one direction, a spring mounted in said housing and operatively connected to said valve and tending to move the valve in the opposite direction, whereby said valve may operate to maintain a predetermined pressure on said piston when the chuck is in operative position, and means for adjusting the tension of said spring to adjust the amount of said pressure.

3. In a chucking mechanism, the combination with a chuck, of a cylinder having front and rear end walls, a piston reciprocable in the cylinder and provided with a bore extending entirely therethrough, a draw-bar secured at its front end to the chuck and extending through the bore in said piston and through an opening in the rear end wall of the cylinder, means projecting beyond the rear end wall of the cylinder and operable from the exterior of the cylinder for adjustably securing the draw-bar to the piston at its rear end, and means for exerting pressure selectively on opposite sides of the piston to move the draw-bar to or from chucking position.

4. In a chucking mechanism, the combination of a rotary work spindle and a chuck therefor, of a cylinder secured to the work spindle and having three parallel spaced grooves formed on its periphery, a piston reciprocable in the cylinder, a draw-bar secured at its rear end to the piston and connectible at its front end to the chuck, and means for conducting a hydraulic pressure fluid to and from the two sides of the piston comprising a relatively fixed part in which the cylinder is rotatable, a duct in said relatively fixed part which leads to the central groove of the three grooves formed on the periphery of the cylinder, a second duct in said relatively fixed part which leads to the two end grooves of the three grooves, means connecting the central groove to one side of the piston, means connecting the two end grooves to the other side of the piston, and a valve controlling supply and exhaust of the motive fluid to the two ducts.

LEONARD O. CARLSEN.